United States Patent
Vala et al.

(10) Patent No.: US 7,529,717 B2
(45) Date of Patent: May 5, 2009

(54) UNIVERSAL QUANTUM COMPUTING

(75) Inventors: Jiri Vala, Berkeley, CA (US); Birgitta Whaley, Berkeley, CA (US)

(73) Assignee: MagiQ Technologies, Inc., New York, NY (US)

( * ) Notice: Subject to any disclaimer, the term of this patent is extended or adjusted under 35 U.S.C. 154(b) by 509 days.

(21) Appl. No.: 10/547,262

(22) PCT Filed: Jan. 21, 2004

(86) PCT No.: PCT/US2004/001522

§ 371 (c)(1),
(2), (4) Date: Aug. 29, 2005

(87) PCT Pub. No.: WO2004/084132

PCT Pub. Date: Sep. 30, 2004

(65) Prior Publication Data

US 2006/0179029 A1    Aug. 10, 2006

Related U.S. Application Data

(60) Provisional application No. 60/455,395, filed on Mar. 18, 2003.

(51) Int. Cl.
*G06F 15/18* (2006.01)
(52) U.S. Cl. .............................. 706/12; 706/14; 706/46
(58) Field of Classification Search ........................ None
See application file for complete search history.

(56) References Cited

U.S. PATENT DOCUMENTS 7,277,872 B2    10/2007    Raussendorf et al.
7,364,923 B2    4/2008    Lidar et al.
2003/0040168 A1    2/2003    Cain et al.
2003/0121028 A1    6/2003    Coury et al.
2003/0169041 A1    9/2003    Coury et al.

OTHER PUBLICATIONS

Michael A. Nielsen et al., Quantum computation and Quantum information, 2000, Cambridge.*

(Continued)

*Primary Examiner*—Joseph P Hirl
(74) *Attorney, Agent, or Firm*—Opticus IP Law PLLC

(57) ABSTRACT

The present invention is directed to systems and methods of providing universal quantum computation that avoid certain external control fields that either are hard or impossible to implement, or are serious sources of decoherence (errors). The systems and methods extend the set of scalable physical platforms suitable for implementing quantum computation in solid state, condensed matter and atomic and molecular physics systems. The invention includes identifying of suitable encodings of logical qubits into three physical qubits—i.e. three quantum mechanical systems of two levels—and performing quantum computing operations by changing the quantum states of physical qubits making up one or more logical qubits using only generalized anisotropic exchange interactions. This includes performing a quantum unitary operation over a single logical qubit or a non-local (entangling) two-qubit unitary operation. An exemplary embodiment of the invention uses a physical qubit represented by two electronic quantum levels of a nanoparticle supported in an electromagnetic cavity. The physical qubit, i.e. its quantum levels, can be tuned by electromagnetic field from a pulsed laser, so that the qubit can be brought into the interaction (resonance) with another physical qubit via exchange of cavity quantum electromagnetic modes.

29 Claims, 4 Drawing Sheets

OTHER PUBLICATIONS

Jiri Vala et al., Encoded Universality for Generalized anisotropic Exchange Hamiltonians, Apr. 2002, University of California, 1-15.*

D. P. DiVincenzo et al., Universal quantum computation with the exchange interaction, Nov. 2000, Nature, 339-342.*

J. Kempe et al., Encoded Universality from a Single Physical Interaction, 2001, Rinton Press, 33-55.*

D. Bacon et al., Encoded Universality in Physical Implementations of a Quantum Computer, Apr. 2001, University of Toronto, 1-6.*

L. A. Wu et al., Power of anisotropic exchange interactions: Universality and efficient codes for quantum computing, 2002, The American Physical Society, 1-5.*

L. A. Wu et al., Power of anisotropic exchange interactions: Universality and efficient codes for quantum computing, Nov. 2001, University of Toronto, 1-5.*

D. A. Lidar et al., Reducing Constraints on Quantum Computer Design by Encoded Selective Recoupling, 2001, The American Physical Society, vol. 88, No. 1, 017905-1, 017905-4.*

D. P. DiVincenzo et al., Universal quantum computation with the exchange interaction, 2000, Nature, vol. 408, 339-342.*

Nielsen et al, "Quantum computation and quantum information," Cambridge Univ. Press, select pages as submitted.

Imamoglu et al, "Quantum information processing using quantum dot spins and cavity QKD," Phys. Rev. Lett., vol. 83, No. 20 (Nov. 15, 1999).

DiVincenzo et al,"Universal quantum computation with the exchange interaction," Nature, vol. 408, Nov. 16, 2000.

Kempe et al.,"Theory of decoherence-free fault-tolerant universal quantum computation," Phys. Rev. A vol. 63 042307 (Mar. 20, 2001).

Kempe et al.,"Encoded universality from a single physical interaction," Quantum Information and Computation, vol. 1 (2001).

Bacon et al.,"Encoded universality in physical implementations of a quantum computer," arXIV:quant-ph/0102140 v1 (Apr. 13, 2001).

Wu et al.,"Power of anisotropic exchange interactions: universaility and efficient codes for quantum computing," arXiv:quant-ph/0103039 (Nov. 14, 2001).

Wu et al.,"Power of anisotropic echange interactions:universality and efficient codes for quantum computing," Phys. Rev. A vol. 65 042318 (Apr. 4, 2002).

Vala et al.,"Encoded universality for generalized anisotropic exchange Hamiltonians," Phys. Rev. A 66, 022304 (Aug. 8, 2002).

Lidar et al.,"Reducing constraints on quantum computer design by encoded selective recoupling," Phys. Rev. Lett., vol. 88, No. 1 (Jan. 7, 2002).

* cited by examiner

UNIVERSAL QUANTUM COMPUTING

CLAIM OF PRIORITY

This patent application claims priority from U.S. Provisional Patent Application No. 60/455,395, filed on Mar. 18, 2003.

STATEMENT OF GOVERNMENT RIGHTS

This invention was made with U.S. government support under grant N00014-01-1-0826 awarded by the U.S. Office of Naval Research and under AF Agreement F30602-01-2-0524 awarded by the U.S. Air Force Research Laboratory. Accordingly, the United States government has certain rights in the invention.

TECHNICAL FIELD

This invention relates to computation, and more specifically to quantum computation and quantum information processing.

BACKGROUND ART

Quantum mechanical systems have been investigated for numerous applications known as quantum information processing including quantum computation, quantum communication and quantum cryptography. A quantum system can be used to store and very efficiently process information which is carried in its two-state quantum subsystems, called quantum bits or "qubits." The computation and information processing based on quantum mechanical principles can outperform classical computation and information processing in a number of tasks like database search and prime factorization problems.

A quantum computer is particularly attractive tool if it is "universal," that is, capable of solving any computable task. Quantum computation is known to be universal as long as arbitrary single-qubit and non-local (entangling) two-qubit unitary operations can be applied in an arbitrarily structured sequence called a quantum circuit. These operations are a result of the physical structure of the system and control fields applied on it, which both are embodied in the Hamiltonian of the system. Universality is thus determined fundamentally by the physical structure of the qubit implementation and by control of this with clear distinction between controlling an interaction that is intrinsic to the system, and introducing a new interaction with an external control field. In many of the possible physical implementations (for details on proposed implementations, see for instance S. L. Braunstein and H. K. Lo, "Scalable quantum computers, paving the way to realization", Wiley-VCH, 2001), the inherent physical interactions do not suffice to generate the universal set of quantum computing operations over physical qubits and must be supplemented by such additional. external Hamiltonian control terms. This may introduce demanding nanoscale engineering constraints as well as additional unwanted sources of decoherence (i.e. a noise process which destroys the effectiveness of a quantum computer). Consequently, the question of whether and how we can use a particular physical system containing some very specific, non-generic interactions, for universal quantum computation has become very relevant with increasing technological effort in the area of implementation of quantum computation.

The solution of the problem of a lack of universality of numerous intrinsic physical interactions can be constructed by a suitable encoding of the states representing quantum logic into a two and higher dimensional subspace of the system Hilbert space. This concept is called "encoded universality". The significance of the encoded universality schemes for quantum computation lies in the fact that they require active manipulation of only two-particle exchange interactions, and hence can be generically referred to "exchange-only computation", and hence avoid other sources of decoherence like application of additional control fields. They are closely related to numerous proposals for quantum computation in solid state systems in which the exchange interaction is a common feature.

SUMMARY OF THE INVENTION

The present invention has industrial utility with regard to systems for and methods of quantum computing. The present invention is directed to such systems and methods that allow for universal quantum computation that avoid external control fields as sources of decoherence. The systems and methods have industrial utility in extending the set of scalable physical platforms suitable for implementing quantum computation in a solid state environment In summary, an encoding of logical qubits into three physical qubits (i.e. three quantum mechanical systems of two levels) and methods is presented to perform (1) any quantum unitary operation over a single logical qubit and (2) a non-local (entangling) two-qubit unitary operation, specifically C(Z), using only multi-body interaction (i.e. generalized anisotropic exchange interaction). This set of quantum operations is known to be universal. The present invention thus provides a method for universal quantum computation.

An aspect of the present invention is a system and method for quantum computation using only the generalized exchange interaction between qubits comprising the steps of defining a Hilbert space to represent a physical system; defining encoding of logical qubits into this physical system and storing the quantum information; selecting a set of quantum observables for this system; defining the transformations between encoded logical qubits including both single qubit and two qubit quantum operations; providing the most appropriate architecture for implementation of encoded quantum information and its manipulations; providing the sequences of elementary operations to implement the single qubit and two qubit gates.

Another aspect of the invention is a method of universal quantum computing with physical qubits having two possible quantum states. The method includes forming a collection of one or more logical qubits, with each logical qubit formed from three physical qubits coupled by a generalized anisotropic exchange interaction. One or two physical qubits in each logical qubit labels a value of 0 or 1 for the corresponding logical qubit. The method also includes altering the quantum state of two physical qubits in at least one of the logical qubits by selectively activating the generalized anisotropic exchange interaction. The method further includes reading the value of the one or more logical qubits by detecting the value of the physical qubits that label the value of the corresponding one or more logical qubits.

Another aspect of the invention is an apparatus and method to perform universal quantum computing by defining all universal encodings of quantum information, constructing the initial states for quantum computation, defining the appropriate quantum computer architecture, and processing the quantum information using the quantum mechanical system by controlling multi-body interactions.

Physical systems for implementation of quantum computation include solid state systems, e.g., quantum nanoparticles interacting via cavity field or atoms fixed in a solid state crystal (e.g. silicon), trapped ions, neutral atoms in optical lattices, NMR machines including solid state NMR techniques, superconducting electronics, and electrons flowing on helium surface. See for example S. L. Braunstein and H.-K. Lo, "Scalable quantum computers, paving the way to realization", Wiley-VCH, 2001, the teaching of which are incorporated herein by reference (see http://www.wiley-vch.de/books/tis/eng/3-527-40321-3.html).

The present invention also provides an apparatus and method for performing universal quantum computation on the DFS by controlling only multi-body interactions in a physical system which by itself is not universal and hence does not suffice to construct a quantum computer. This interaction is relevant to a number of the recent proposals for solid state implementation of quantum computation when additional physical effects such as symmetry breaking perturbations, originating for instance from surface and interface effects, spin-orbit coupling (Dzyaloshinski-Moriya term), dipole-dipole coupling in the spin-spin interaction, and anisotropy in the exciton exchange interaction in quantum dots are taken into account. The asymmetric anisotropic interaction including these cross-terms is also a part of quantum computation with fermionic systems such as quantum states of electrons.

As discussed below, a preferred example of an apparatus for forming a physical embodiment of the invention for performing universal quantum computation, is an apparatus consisting of n quantum nanoparticles (e.g. atoms, molecules, quantum dots, etc.) localized on a microscopic cavity which mediates their interactions, and a controller for providing predetermined sequences of pulses of frequencies, durations and intensities (power levels) intended to excite the nanoparticles into any state inside $2^n$ dimensional Hilbert space.

DETAILED DESCRIPTION

Generalized Anisotropic Exchange Interaction

Figure 1:
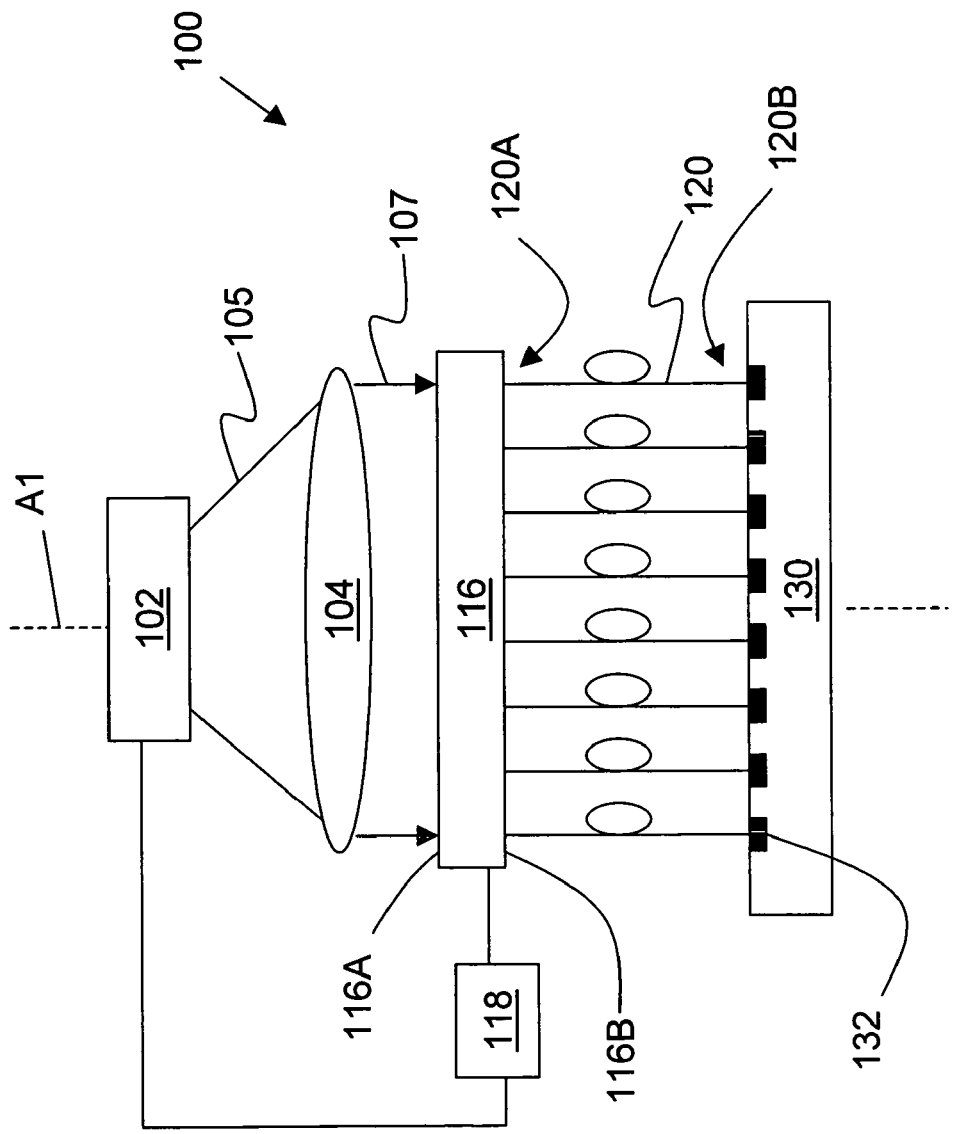
FIG. 1 is a schematic side-view diagram showing an exemplary embodiment of an apparatus according to the invention, the apparatus having a number of quantum nanoparticles localized on a microscopic cavity whose interaction via a cavity field is controlled by laser fields.

The present invention is directed to universal quantum computation with physical systems whose quantum bits interact via the generalized anisotropic exchange interaction. The Hamiltonian, i.e., the observable describing this interaction, allows asymmetry in the exchange tensor, i.e., $J^{zz}=0$, $J^{xx} \neq J^{yy}$, and also incorporates additional cross-terms, $\sigma^\alpha_i \sigma^\alpha_j$, $\alpha \neq \beta$. The total interaction can then be described as follows, $$H_{ij} = (1/2)\Sigma_{\alpha=x,y} J^{\alpha\alpha}_{ij} \sigma^\alpha_i \sigma^\alpha_j + (1/2)\Sigma_{\alpha \neq \beta=x,y} J^{\alpha\beta}_{ij} \sigma^\alpha_i \sigma^\beta_j \qquad (1)$$

where $J_{ij}$ is the strength of the interaction between qubits whose upper index ($\alpha\alpha$ or $\alpha\beta$) indicates the character of the term (i.e. xx, yy, xy or yx), and $\sigma^\alpha$ are the Pauli matrices.

This asymmetric anisotropic Hamiltonian can be seen to split into two distinct parts that act on orthogonal two-dimensional sectors of the four-dimensional Hilbert space $$H_{ij} = J^s_{ij} + J^a_{ij} + K^s_{ij} + K^a_{ij} = (1/2)[J^s_{ij}(\sigma^x_i \sigma^x_j + \sigma^y_i \sigma^y_j) + J^a_{ij}(\sigma^x_i \sigma^x_j - \sigma^y_i \sigma^y_j) + K^s_{ij}(\sigma^x_i \sigma^y_j - \sigma^y_i \sigma^x_j) + K^a_{ij}(\sigma^x_i \sigma^y_j - \sigma^y_i \sigma^x_j)] \qquad (2)$$

where $J^s_{ij}=(J^{xx}_{ij}+J^{yy}_{ij})/2$, $J^a_{ij}=(J^{xx}_{ij}-J^{yy}_{ij})/2$, $K^s_{ij}=(J^{xy}_{ij}+J^{yx}_{ij})/2$, $J^a_{ij}=(J^{xy}_{ij}-J^{yx}_{ij})/2$.

These sectors are characterized by the parity of the bit string which refers to even or odd occupation number defined as the number of 1's in the bit string. In particular, the symmetric terms $J^s_{ij}$ and $K^s_{ij}$ operates in the subspace spanned by $\mathsf{S}=\{|01>,|10>\}$, and the antisymmetric term $J^a_{ij}$ and $K^a_{ij}$ in the subspace spanned by $@=\{|00>,|11>\}$. The symmetric term of the Hamiltonian preserves the occupation number and is used in this invention for processing of quantum information, while the antisymmetric changes this occupation number by two and is used in this invention for initialization of the physical qubits for quantum computation. In particular, the symmetric component of the interaction (indexed "s") acts only in $\mathsf{S}$, and the antisymmetric part (indexed "a") only in @. In each of the two subspaces the interaction is characterized by the expression $J^k_{ij}\sigma^x\mathsf{S}+K^k_{ij}\sigma^y\mathsf{S}$, where the index k is either s or a. This can be reformulated as $J^k_{ij}\sigma^+\mathsf{S}+J^{k*}_{ij}\sigma^-\mathsf{S}$, where the effective coupling is now a complex number, $$J^k_{ij} = J^k_{ij} - i K^k_{ij} \qquad (3)$$

The operators $\sigma^x\mathsf{S}$, $\sigma^y\mathsf{S}$, $\sigma^+\mathsf{S}$, and $\sigma^-\mathsf{S}$ now apply to the pairs of states within any of the two-dimensional subspaces $\mathsf{S}$ and @.

Exemplary Embodiments Of The Invention

The present invention employs the generalized anisotropic exchange interaction for quantum information processing, including universal quantum computation. Since this interaction is not by itself universal, the present invention extends the number of physical systems which can be used for realization of a quantum computer. Since this interaction is also the result of imperfections and symmetry breaking conditions in quantum computer fabrication, the present invention also allows elimination of these undesired effects.

The origin of the asymmetry in the anisotropic interaction can be understood as a consequence of energy non-conserving terms in the system Hamiltonian. The antisymmetric terms ($J^a$ and $K^a$) represents an energy non-conserving process similar to the anti-rotating wave terms arising in the interaction of a two-level system with semiclassical radiation, but happening now in a correlated way on both coupled physical qubits. We may assume that asymmetry in the anisotropic exchange interaction between physical systems is a consequence of the system complexity when numerous mechanisms of mutual coupling take place simultaneously. An example of similar symmetry breaking in the case of the isotropic (Heisenberg) exchange interaction between quantum dots derives from the spin-orbit or a (usually weaker) dipole-dipole coupling.

This interaction is relevant to a number of the recent proposals for solid state implementation of quantum computation when additional physical effects such as symmetry breaking perturbations, originating, for instance, from surface and interface effects, spin-orbit coupling (Dzyaloshinski-Moriya term), dipole-dipole coupling in the spin-spin interaction, and anisotropy in exciton exchange interaction in quantum dots are taken into account. The asymmetric anisotropic interaction including these cross-terms is also a feature of quantum computation using fermionic systems, such as quantum states of electrons.

Nanoparticles Interacting Via Cavity Quantum Fields

An exemplary embodiment of a universal quantum computing apparatus 100 according to the present invention is schematically illustrated in FIG. 1. Apparatus 100 includes, along an optical axis A1, a pulsed laser source 102 having a wavelength, pulse duration and power suitable for addressing electronic and nuclear levels of nanoparticles (e.g., atoms, molecules, quantum dots, etc.). A collimating lens 104 is arranged to receive radiation 105 from the pulsed laser and form a collimated beam 107 of radiation 105. Apparatus 100 includes a spatial light modulator 116 arranged to receive the collimated radiation at an input side 116A and output modulated radiation at an output side 116B. A suitable spatial light modulator is, for example, a commercially available one-dimensional or two-dimensional 128-pixel or 256-pixel modulator, available from Meadowlark Optics, Inc. Spatial light modulator 116 is operably coupled to a controller 118, which is also connected to laser source 102 and controls the operation of apparatus 100.

Apparatus 100 further includes optical fiber sections 120 each having an input end 120A and an output end 120B. Optical fiber sections 120 are optically coupled to modulator output side 116B at respective pixels so that the light passing through each pixel is communicated to a corresponding optical fiber section. A microcavity 130 is arranged downstream of the spatial light modulator 116. Microcavity 130 is adapted to support nanoparticles 132 (e.g., atoms, molecules, quantum dots, etc.) in a manner that allows for a controlled exchange interaction between the nanoparticles. The output ends 120B of the optical fibers are operably coupled to the nanoparticles 132 supported in microcavity 130 so that the laser radiation 105 can interact with the nanoparticles.

In the operation of apparatus 100, a physical qubit is, for example, represented by two distinct electronic levels of a nanoparticle 132. The electronic levels of the nanoparticle are manipulated by the electromagnetic field of the laser radiation 105 carried to the nanoparticle by optical fiber sections 120. Microcavities and interaction between nanoparticles mediated by cavity fields are subjects of intense experimental research. See, for example, the web page of the experimental group by Evelyn Hu at the University of California at Santa Barbara.

Thus, apparatus 100 creates a controlled exchange interaction between nanoparticles 132 via quantized modes of an electromagnetic field ("laser field") inside a suitably fabricated microcavity 130 (including, for example, microdisc, circular and spherical cavities). Pairs of electronic levels of two different nanoparticles 132, defining two distinct quantum bits, are brought into the exchange interaction by tuning these levels into resonance with the cavity modes using the external pulsed laser field of radiation 105. This operation corresponds to quantum information processing.

In addition, in an example embodiment, initialization of the quantum states of the encoded logical qubit is carried out using the same interaction but exploiting its antisymmetric component. In order to determine the final state of the quantum computer, the measurement of the logical qubits is carried out via detection of its constituents, physical qubits. Once the encoding of a logical qubit is defined, the state of the logical qubit can be uniquely determined by detecting the state of only one specific physical qubit from the code word. This can be carried out, for example, by selective fluorescent detection used in other known implementations of quantum computation (e.g., trapped ions, neutral atoms in optical lattices, etc.). Determining spin by a nuclear magnetic resonance (NMR) technique may also be used in a exemplary embodiment of the invention.

Other exemplary embodiments of apparatus 100 can be based, for example, on different solid state platforms, trapped ions, trapped neutral atoms interacting via a cavity fields, and superconducting qubits, all of which are currently a subject of profound experimental investigation.

Universal Codes

The minimal set of physical qubits for which the asymmetric anisotropic exchange Hamiltonians between neighboring physical qubits can generate universal set of quantum computing operations, consists of three qubits. The Hilbert space describing all physical states of this three qubit system is spanned by eight orthogonal wavefunctions (note that $8=2^3$). Each of these states is thus characterized by a string of three bits. Under the interaction, the Hilbert space splits into two four dimensional subspaces, $\mathcal{H} = \mathcal{H}^4 \oplus \mathcal{H}^4$, which are characterized by different bit-string parities. These subspaces are not mixed by the interaction Hamiltonian (1), which preserves the bit-string parity (i.e. the number of one's in the bit string). The four-dimensional subspaces thus define two independent codes (i.e., two sets of four different trios of physical qubits) that are spanned by the following two sets of code words:

Code (I)={|000>,|110>,|101>,|011>}

Code (II)={|111>,|001>,|010>,|100>} (4)

with an even and odd number of one's.

Each physical qubit of the code word corresponds to a quantum system of two levels. These are represented by any two distinct quantum states of a complex quantum system (e.g., atoms, molecules, nanoparticles, electrons, etc.), which, in the case of nanoparticles, may for instance be two distinct electronic states characterized by wavefunctions of different orientation of electronic spin. The value "0" and "1" of the quantum bit (qubit) may then correspond to the parallel and antiparallel spin orientation with respect to a suitably chosen axis. For example, these can be defined as $|0>=|S=1/2,m_z=-1/2>$ and $|1>=|S=1/2,m_z=+1/2>$ where the axis z is chosen for the spin projection $m_z$ of the system of total spin $S=1/2$. A logical qubit can in principle be defined as any pair of these states, although for quantum information processing it is advantageous to use only states of identical occupation number from each of the code spaces. For instance, the logical qubit can be encoded as $|0_L>=|101>=|S=1/2,m_z=1/2>_1|S=1/2,m_z=-1/2>_2|S=1/2,m_z=1/2>_3$ and $|1_L>=|011>=|S=1/2,m_z=-1/2>_1|S=1/2,m_z=1/2>_2|S=1/2,m_z=1/2>_3$, where the lower index (1, 2 and 3) indicates the physical qubits.

Single-Qubit Operations

Asymmetric Anisotropic Exchange

Figure 2:
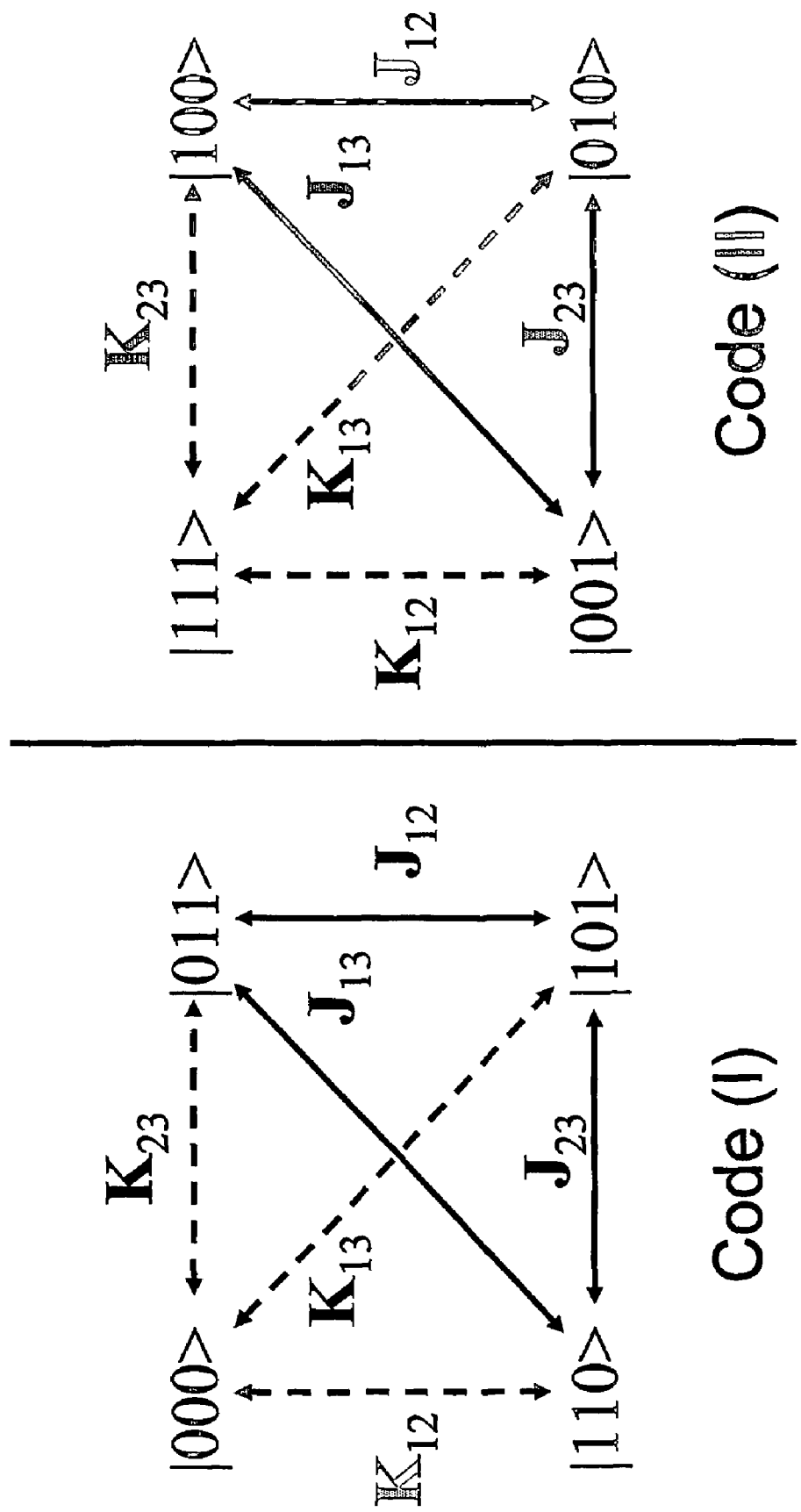
FIG. 2 is a schematic diagram that illustrates the actions of the asymmetric anisotropic exchange interactions over the three qubit code spaces according to an exemplary embodiment of the invention, wherein the solid arrows transform code words via the symmetric component of the Hamiltonian, while the dashed arrows transform code words through its antisymmetric part, wherein the former preserves the occupation number while the latter changes the occupation number by two while conserving the parity, with the indexes indicating which physical qubits are coupled.

The Hamiltonian (without cross terms) is applied to the pairs of physical qubits 1-2, 1-3, and 2-3, in the three qubit codes (4). The effect of this interaction is the same for both codes, i.e. for (I) and for (II) as the Hamiltonian acts simultaneously and identically on both subspaces $S^4$, without mixing them. It can therefore be expressed as a direct sum of two 4×4 matrices in the basis of the codes (I) and (II). In the code basis (4), the effect of the asymmetric anisotropic exchange interaction, schematically summarized in FIGS. 2A and 2B. For example, the Hamiltonian matrix $H_{12}$ represents the coupling between the physical qubits 1 and 2 via its symmetric and antisymmetric components (characterized by the coupling strengths $J^s$ and $J^a$). The earlier simultaneously transforms the logical qubits |000> and |110> in the code space (I), and |111> and |001> in the code (II); while the latter simultaneously transforms the logical qubits |011> and |101> in the code space (I), and |100> and |010> in the code (II). Similarly, the Hamiltonian $H_{23}$ generates transformation between the qubits 2 and 3 within three physical qubits of the code; and the matrix $H_{13}$ generates transformation between the physical qubits 1 and 3.

Let us now consider the action of these three matrices and of their commutators. We start with $H_{12}=(J^a\sigma^x)\oplus(J^s\sigma^x)$. It is evident that the symmetric component of $H_{12}$ (with coupling strength $J^s$) acts as a $\sigma^x_{34}$ operation over the code words the states |101> and |011> from the code (I), and over the states |010> and |100> from (II), i.e. it acts as encoded $\underline{\sigma}^x$ on the states in both (I) and (II). The antisymmetric component of $H_{12}$ acts on the other two orthogonal states from the code, namely on |000> and |110> from (I), or on |111> and |001> from (II). This also results in an encoded $\underline{\sigma}^x$ operation but with coupling strength $J^a$. This is the first element required for an encoded SU(2) operation necessary for universal quantum computation.

The second element is an encoded $\underline{\sigma}^y$ operation. These operations are generated through the commutator of a pair of Hamiltonian matrices. For instance, taking the commutator of interactions between physical qubits 1-3 and qubits 2-3 yields $[H_{13},H_{23}]=i(J^{a2}-J^{s2})\sigma^y_{34}$, where $\sigma^y_{34}$ acts exclusively on the states |101> and |011>. Since all other elements of the resulting 4×4 matrix are equal to zero, this commutation relation results exclusively in an encoded $\underline{\sigma}^y$ operator between the code words 3 and 4 from the code (I) and (II).

The third and last element required for an encoded SU(2) operation is encoded $\underline{\sigma}^z$. These operations are now obtainable from a second level commutator, namely of the Hamiltonian matrix with the encoded $\underline{\sigma}^y$ operations. For example, $[H_{12}, \sigma^y_{34}]=i2J^s\sigma^z_{34}$.

Together, these three encoded $\underline{\sigma}^x$, $\underline{\sigma}^y$, and $\underline{\sigma}^z$ operations ensure that any arbitrary SU(2) operation may be performed on the encoded qubits. We note that the Hamiltonian matrices always act simultaneously on both sets of orthogonal subspaces (I) and (II). We can use the encoded operations described above to generate additional encoded $\underline{\sigma}^x$ operations that do not simultaneously act on the orthogonal subspaces from the code, by forming the commutator between the $\underline{\sigma}^y$ and $\underline{\sigma}^z$ operators.

Analogous sets of operators can be defined starting from the other two exchange Hamiltonians, i.e., $H_{13}$ and $H_{23}$. The connections resulting from all of Hamiltonian interactions and their commutators are equivalent in each case. In total therefore, we have three distinct ways of defining the logical qubit from each of the subspaces (I) and (II), with arbitrary SU(2) operations possible on any of these six possible sets of qubits. From the subspaces (I) the possible encodings are {|110>,|011>}, or {|110>,|101>}, or {|101>,|011>}. From the subspace (II) the possible qubit encodings are {|001>, |100>}, and {|001>,|010>}, and {|010>,|100>}. These encodings make stored logical qubits protected against decoherence, namely collective dephasing error generated by the operator $(1/2)\Sigma_{k=1}^3\sigma^z_k$.

Cross-Product Terms

The inclusion of the cross-product terms transforms the Hamiltonian matrices from the previous section into hermitian matrices of the same structure whose coupling coefficients $J^a=J^a_{ij}/2$ and $J^s=J^s_{ij}/2$ are now complex (see (3)). In fact, the situation captured in the Hamiltonian is the most general anisotropic exchange form containing asymmetry in all terms including the cross-products. It provides a generalization of the usual symmetric anisotropic exchange referred to as an XY model.

Under these circumstances, application of the commutation relations between the Hamiltonian matrices is still capable of generating the SU(2) algebra for single qubit operations necessary for universal quantum computation. The result of the commutation relation is again TKTKproportional to the $\underline{\sigma}^y$ operation. For instance, $[H_{13},H_{23}]=(|J^a|^2-|J^s|^2)\sigma^y_{34}$. On the other hand, elementary matrix algebra shows that now only two of three possible commutation relations between pairs of complex Hamiltonian matrices of the three-qubit code can eliminate the coupling between states of different occupation number and thereby generate this encoded $\underline{\sigma}^y$. The commutation relation which does not generate this transformation is $[H_{12}, H_{23}]$. The universal encodings of a logical qubit are then: {|110>,|101>}, or {|101>, |011>} from the subspace (I), and {|001>,|010>}, and {|010>,|100>} from the subspace (II).

Two-Qubit Operations

An entangling two-qubit gate—namely the controlled-Z (C(Z)) operation—is obtained via the following sequence of encoded $\underline{\sigma}^z$ operations:

$$U_{C(Z)}=\exp(i\underline{\sigma}^z_1\pi/4)\exp(i\underline{\sigma}^z_2\pi/4)\exp[-i(\underline{\sigma}^z_1\otimes\underline{\sigma}^z_2)\pi/4] \quad (5)$$

The crucial element of this sequence is the last term on the right hand side. This is enacted by applying the encoded $\underline{\sigma}^z$ operation onto the triplet of physical qubits 2-3-4 that connects two logical qubits within the triangular architecture (see FIG. 3). To illustrate this C(Z) sequence, we focus on an example with the following encoding of logical qubits: $|0_L>=|110>$, $|1_L>=|011>$. The logical two-qubit configurations are then given as $$|0_L0_L>=|110110>|0_L1_L>=|110011>|1_L0_L>=|011110>|1_L1_L>=|011011> \quad (6)$$

where the bold fonts indicate those physical qubits which are 'bridging' two logical qubits. Via commutation relations of the exchange Hamiltonians between the physical qubits 2-4 and 3-4 within the triangular architecture (FIG. 3) we generate the $\sigma^y_{2-3}$ operation which, when commuted further with the exchange interaction between the qubits 2 and 3, results in the corresponding $\sigma^z$ operation. Turning this $\sigma^z$ operation on for the duration $t=\pi/2$ results in a phase transformation of the states, such that $|0_L0_L>=|110110>\rightarrow e^{-i\pi/2}|0_L0_L>$ and $|0_L1_L>=|110011>\rightarrow e^{i\pi/2}|0_L1_L>$. The other two states are not addressed by the encoded operation and remain intact. The resulting diagonal transformation over the logical two-qubit states, characterized by diagonal elements $\{-i,i,1,1\}$, has provided the desired entanglement between the logical qubits. We emphasize that we needed one double commutator to obtain this transformation. In order to illustrate that this suffices to generate the controlled-Z operation, we first apply an encoded $\sigma^z$ onto the second logical qubit for duration $t=\pi/4$. This further transforms the relative phase relations between the states of two logical qubits to $\{-i,1,1,-i\}$ (up to an overall phase $e^{-i\pi/4}$). This result is equivalent to the unitary transformation $\exp[-i(\sigma^z_1 \otimes \sigma^z_2)\pi/4]$ in (5). This transformation, when supplemented by the encoded single qubit $\sigma^z$ rotations on both logical qubits, results in the desired controlled-Z operation, C(Z).

Decoherence Properties

Decoherence is a noise process in quantum computing which may destroy the significant effectiveness of quantum computation compared to classical computation. This process results from coupling of logical qubits into the environment in which quantum information is lost to the environment. It is therefore highly advantageous to provide conditions under which the effect of decoherence is limited or eliminated. The residual decoherence can be eliminated by the process known as error correction (U.S. Pat. No. 6,128,764 to Gottesman discusses quantum computation).

The encodings, presented in this invention, are eigenvectors with identical eigenvalues of the operator $(1/2)\Sigma_{k=1}^{3}\sigma^z_k$. This operator (also known as the parity operator) generates the error (decoherence) process known as collective dephasing. As long as the quantum information is stored in these encodings, it is protected against this class of error; during quantum computing operations the information is not necessarily protected. The invention presents a method for storing quantum information in decoherence free subsystem of a quantum mechanical system of three physical qubits in the case of collective dephasing error.

Implementation

Initialization of a Quantum Computer According to the Invention

In exemplary embodiments of the invention, the initial state of physical qubits of the code (usually |000>) may be initialized to a desired value of the encoded logical qubit (usually $|0_L>$). The latter can be represented either by any state with two "1" from the code (I) or any state with one "1" from the code (II). Starting from the state |000>, for example, the desired $|0_L>=|110>$ is provided by application of the anisotropic interaction on the first and second physical qubits for the duration of time given as $\pi/2J^a$. This pulsed interaction just inverts the values of the first two physical qubits, and thus initializes the desired state of the logical qubit. Similarly, the same pulsed interaction can be applied on any other pair of physical qubits in order to provide any of the other alternatives for encoding logical qubit.

Quantum Information Processing

Exemplary embodiments of universal quantum computation according to the invention, featuring generalized anisotropic exchange interactions, are considered as applications of the theoretical development of encoded universality with this class of Hamiltonians into an appropriate quantum circuit. A practical question is implementation of the commutation relations. Previously considered implementation procedure via the Baker-Hausdorff-Campbell operator expansion does not necessarily provide the efficiency required in practical implementation.

Figure 4:
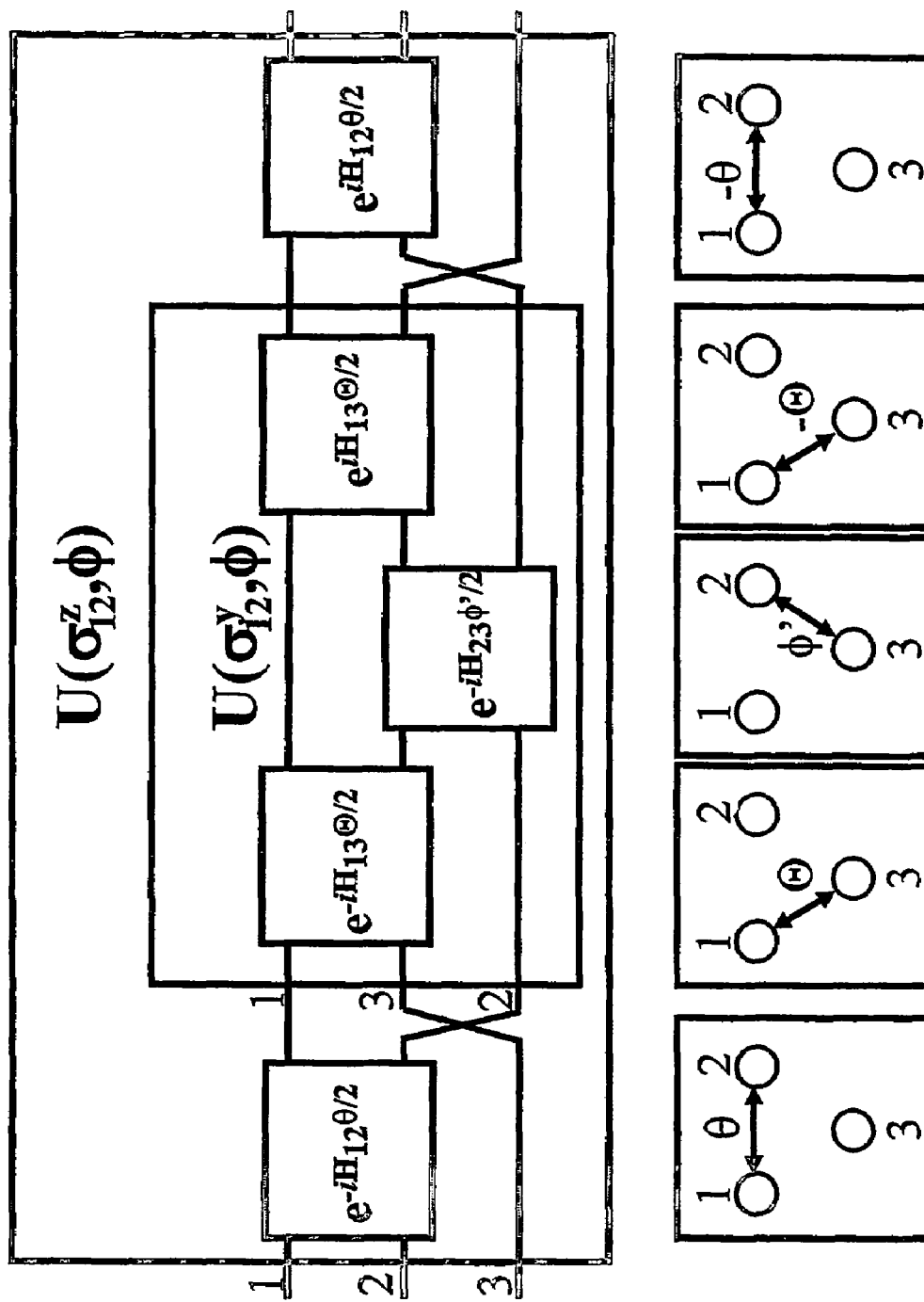
FIG. 4 is a schematic diagram of an example embodiment of a quantum circuit illustrating the pulse sequence for generating encoded single qubit operations.

A useful approach according to the invention is based on conjugation by unitary operations, which is embodied in a short sequence of coupling operations, i.e. a quantum circuit, such as illustrated in FIG. 4. In the present invention, a short quantum circuit is formulated which provides the same effect over the encoded qubit as exponentiated commutation relations, and thus establishes equivalence between both. The complication due to the presence of the antisymmetric terms in the Hamiltonian matrices is eliminated by choosing a suitable duration of the exchange interaction. Since $[J^s_{ij}, J^a_{ij}]=0$ for any physical qubits i and j, the unitary evolution operator generated by the Hamiltonian (1) splits into a product $U(\tau)= \exp(-i\,J^s_{ij}\,\tau)\exp(-i\,J^a_{ij}\,\tau)$. For a suitably chosen time duration, one of the terms can always be made to generate the identity, if $J^s_{ij} \ne J^a_{ij}$. At the same time, the effect of the other term can be tuned to provide desired transformation.

Single Qubit Operations According to the Invention

This feature of turning off the undesired effect of the antisymmetric terms in the evolution operator by judicious choice of conjugation operations, is illustrated by an exemplary method according to the invention. For example, the unitary evolution generated by the $\sigma^y_{34}$ operator, resulting from the commutation relation $[H_{13}, H_{23}]$, can be obtained from the following conjugation:

$$U(\sigma^y_{34},\phi)=\exp(-i\sigma^y_{34}\phi)=\exp(i\,H_{13}\Theta)\exp(i\,H_{23}\phi')\exp(-i\,H_{13}\Theta) \quad (7)$$

where $\phi'=\phi/J^s$, and $\Theta$ is the time duration satisfying simultaneously the two conjugation conditions $$\Theta=0 (\bmod \pi)/J^a=(\pi/2)(\bmod \pi)/J^s \quad (8)$$

Due to the asymmetry of the exchange coupling terms ($J^s \ne J^a$) and to the unitarity of the quantum evolution, this condition can easily be fulfilled, as long as the ratio of $J^s$ and $J^a$ is not a rational number. The conjugating operation is implemented directly by a sequence of appropriately timed laser pulses focused on a pair of quantum nanoparticles localized on a microdisc cavity, as illustrated in FIG. 4.

The second conjugation needed for $\sigma^z$ operations, implementing the double commutator (Section \ref{sec:onequbit}), is carried out in a similar fashion:

$$U(\sigma^z_{34},\phi)=\exp(-i\sigma^z_{34}\phi)=\exp(i\,H_{12}\theta)U(\sigma^y_{34},\phi)\exp(-i\,H_{12}\theta) \quad (9)$$

Here $U(\sigma^y_{34},\phi)$ is the result of the first conjugation given by Eq. (7). In this exemplary embodiment of the invention, the condition for the time duration of the second conjugating operation generated by $H_{12}$ reads as $\theta=0(\bmod \pi)/J^s=(\pi/4)(\bmod \pi)/J^s$. Both conjugations used for construction of single qubit operations are illustrated, for example, in FIG. 4 as a quantum circuit together with the sequences of operations (e.g. laser pulses) on the physical qubits of an encoded logical qubit.

Development of a conjugating procedure for the case of the general Hamiltonian, containing the cross-product terms, is carried out within the same framework. However the relevant timing conditions have to reflect that the coupling coefficients $J^a$ and $J^s$ may now be complex numbers. Just as in the previous case, the goal is to generate the desired conjugating unitary transformation by exponentiating the appropriate general Hamiltonian operator, where the symmetric part of the interaction leads to exchange between the two coupled code words phase-shifted by imaginary unit i, and the antisymmetric term results in identity. We first illustrate new timing conditions derived from focusing only on the antisymmetric term in the generalized anisotropic exchange.

The antisymmetric coupling acts on the state with even bit-string parity, $@=\{|00>,|11>\}$. It can be reformulated as the sum $J^a\sigma^x_@+K^a\sigma^y_@$ where $\sigma^y_@$ and $\sigma^x_@$ refer only to the even parity states. In order to establish the conjugating condition, this operator is exponentiated and factorized into the product of three unitary operators $\exp(-i\ J^a\sigma^x\Theta)\exp(-i\ K^a\sigma^y\Theta)\exp(i\ J^aK^a\sigma^z\Theta/2)$. The condition for attaining the identity is then:

$$\Theta = 0 (\bmod\ \pi)/J^a = 0 (\bmod\ \pi)/K^a = 0 (\bmod\ \pi)/(J^aK^a/2) \quad (10)$$

Considering now in addition that the coupling coefficient $J^s$ is complex and its imaginary part is also to be eliminated, an analogous timing condition can easily be formulated.

Two Qubit Operations

We now focus on specific aspects of implementation of the two-qubit gates via conjugation. The entangling part of the controlled-Z gate, described above, is obtained as a conditional effect of the $\sigma^z$ operation on the physical qubits of both logical qubits (on the 'bridging' qubits, see FIG. 3). The conjugation however complicates the situation, due to its antisymmetric component which affects also the states $|1_L0_L\rangle = |011110\rangle$ and $|1_L1_L\rangle = |011011\rangle$. However, the effect of the antisymmetric term in the interaction can be completely eliminated by imposing an additional timing condition for the conjugated operation. In the present example, this operation is generated by $H_{23}$, and the timing condition is then given as follows:

$$\phi' = 0 (\bmod\ \pi)/J^a = \phi (\bmod\ 2\pi)/J^s \quad (11)$$

We emphasize that this condition has to be satisfied only up to an arbitrary global phase.

Efficiency

The method according to the invention based on conjugation is much more effective than application of the Baker-Hausdorff-Campbell formula whose asymptotic character translates into a sequence of a large number of elementary operations. In contrast, in the method according to the invention, the conjugation features three gates for implementation of the encoded $\sigma^y$ operation, emulating a single commutation relation, and five gates for encoded $\sigma^z$, corresponding to a double commutator as illustrated, for example, in FIG. 4. The entangling two-qubit operation according to the invention, i.e. the controlled-Z up to the local transformations, is based on generating $\sigma^z$, and hence requires also just five discrete gates. The timing conditions, expressed in number of gates (8) and (10), translate into a prolonged transformation of the conjugating unitaries. It should be pointed out that the duration of the conjugating operation, given by the ratio of the coupling coefficients $J^a$ and $J^s$ in (8), for example, does not change if a larger number of logical qubits defined with this three-qubit encoding are addressed with these gate sequences. Therefore, embodiments of the present invention scale well with respect to size, having only a linear cost in terms of computational complexity as the number of encoded qubits increases.

Alternative embodiments of the invention, in addition to the present analytical approach featuring conjugation, feature numerical optimization of gate sequences in order to generate the desired quantum computing operations.

Architecture

Since the encoded $\sigma^y$ interactions for a given Hamiltonian are defined through the commutation relations with the other two available couplings among three physical qubits, an advantageous architecture for embodiments of the invention is triangular. An equilateral triangular architecture is convenient wherever the coupling between physical qubits is distance dependent, as it ensures that $J^s$ and $J^a$ are the same within any pair of physical qubits taken from a three qubit code, resulting then in pulses of identical durations for any of the coupling. The equilaterality of the triangular architecture is however not a requirement and can be relaxed into any arrangement. The implementation of commutation relations between exchange Hamiltonains via unitary conjugation allows for a number of other architecture structures than equilateral triangle. The change in the coupling strengths ($J^s$ and $J^a$) between physical qubits, which may result from other architectures, would translate into different durations of the conjugating operations as the same timing conditions (see paragraphs above) are satisfied. In fact, this flexibility is an advantageous aspect of the present invention because it allows one to relax the requirement of an equilateral triangular architecture, to a lattice of a rectangular or any other structure in order to accommodate physical and experimental requirements.

Figure 3:
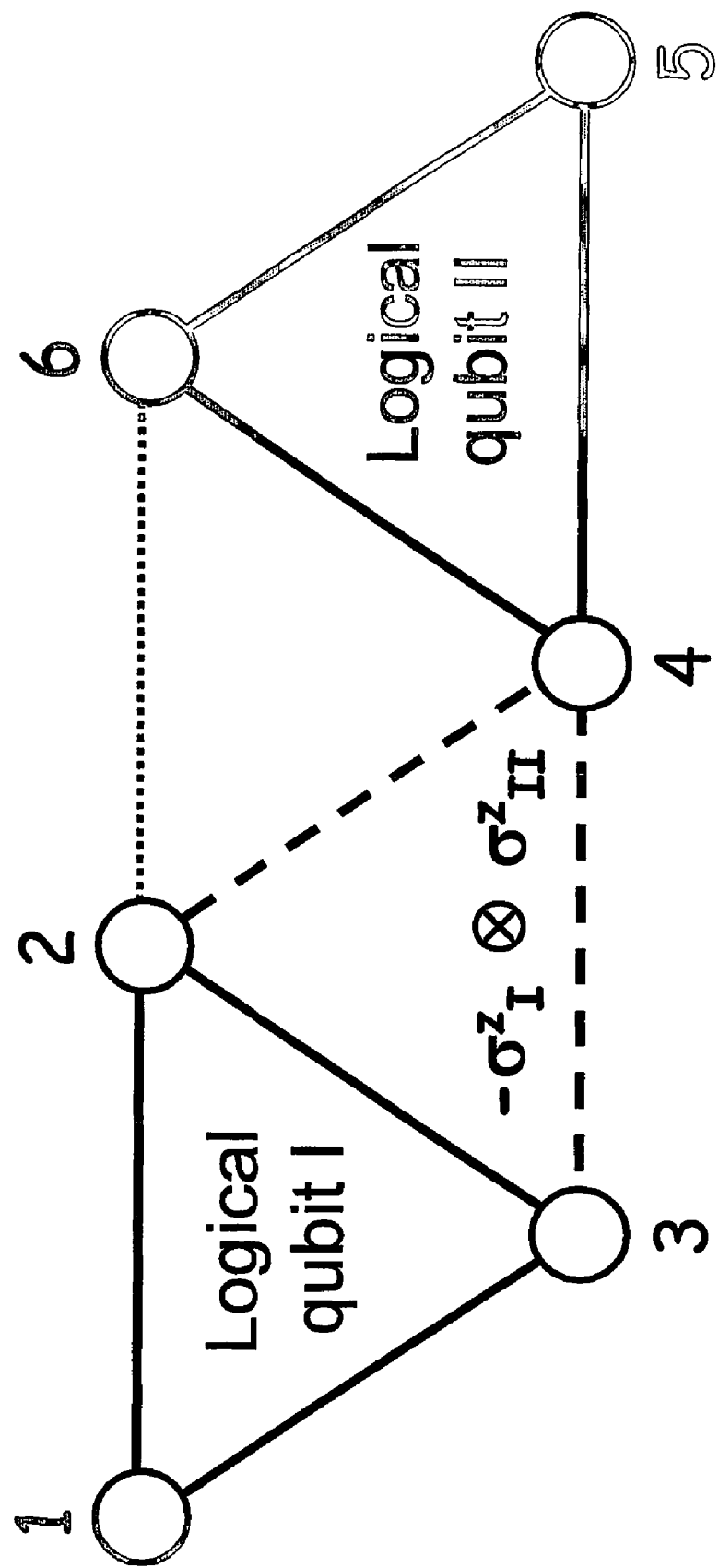
FIG. 3 is a schematic diagram of the layout of an exemplary scalable architecture according to the invention for a two qubit entangling operation, wherein a controlled-Z gate is implemented using the physical qubits connecting two logical qubits within the layout, e.g. physical qubits 2-3-4.

To accommodate additionally two-qubit logical operations, exemplary embodiments of the invention feature arrangements of triangles of physical qubits into a linear chain with alternating triangle orientations. This layout is shown in FIG. 3. Exemplary embodiments of the invention featuring other layouts, such as a hexagonal or cubic lattice, may also be employed under suitable change of durations of conjugating operations.

What is claimed is:

1. A method of quantum computing with physical qubits having two possible quantum states, comprising:
    forming one or more logical qubits each formed from three physical qubits coupled by a generalized anisotropic exchange interaction, wherein one or two physical qubits in each logical qubit labels a value of 0 or 1 for the corresponding logical qubit;
    altering the quantum state of two physical qubits in at least one of the one or more logical qubits by selectively activating the generalized anisotropic exchange interaction; and
    reading the value of the one or more logical qubits by detecting the value of the physical qubits that label the value of the corresponding one or more logical qubits.

2. The method of claim 1, wherein selectively turning on and off the generalized anisotropic exchange interaction to alter the quantum state the two physical qubits includes irradiating the two physical qubits with laser pulses.

3. The method of claim 1, including providing the physical qubits as nanoparticles supported by a microcavity.

4. The method of claim 1, further including performing single-qubit operations by selectively irradiating the two physical qubits making up a logical qubit so as to alter the quantum state of the irradiated physical qubits.

5. The method of claim 1, further including performing two-qubit operations by selectively irradiating the two physical qubits that make up two logical qubits so as to alter the quantum state of the irradiated physical qubits.

6. The method of claim 1, wherein selectively activating the anisotropic exchange interaction includes turning on and off an electromagnetic field from a source of electromagnetic radiation operably coupled to the physical qubits.

7. A method of forming logical qubits, comprising:
    providing physical qubits capable of being in one of two quantum states ($|0\rangle$ and $|1\rangle$) and adapted to interact via a generalized anisotropic exchange interaction; and
    forming, from any pair of three physical qubits selected from either a first physical qubit set $\{|000\rangle, |110\rangle, |101\rangle, |011\rangle\}$ or a second physical qubit set $\{|111\rangle, |001\rangle, |010\rangle, |100\rangle\}$, a logical qubit capable of being in one of two logical states ($|0_L\rangle$ and $|1_L\rangle$).

8. The method of claim 7, wherein the physical qubits are nanoparticles supported in a microcavity.

9. The method of claim 7, including:
altering the logical state of the logical qubit by altering the quantum state of the physical qubits making up the logical qubit by interacting the physical qubits via a generalized an isotropic exchange interaction.

10. The method of claim 9, including performing single-qubit operations by forming a gate with the logical qubit by performing selective generalized anisotropic exchange interactions between select physical qubits that form the logical qubit.

11. The method of claim 9, including performing two-qubit operations by forming gates between two logical qubits by performing selective generalized anisotropic exchange interactions between physical qubits of both logical qubits.

12. The method of claim 7, including reading out values of one or more of the one or more logical qubits by detecting a value of one of the physical qubits in each of the one or more logical qubits.

13. An apparatus for performing quantum computing operations, comprising:
a pulsed laser source adapted to emit pulsed radiation;
a collimating lens arranged to receive the radiation and form therefrom a collimated radiation beam;
a spatial light modulator arranged to receive the collimated radiation at an input side and adapted to output modulated radiation at an output side;
a controller operably coupled to the laser source and the spatial light modulator;
a microcavity arranged downstream of the spatial light modulator, the microcavity adapted to support a collection physical qubits in a manner that allows for each physical qubit to occupy one of two different quantum states ($|0>$ and $|1>$) and that allows for a controlled exchange interaction between the physical qubits;
wherein the controller is adapted to control the modulation of the modulator so that modulated radiation delivered to the microcavity interacts with the physical qubits so as to tune some or all of the physical qubits into the exchange interaction via an exchange of microcavity quantum electromagnetic modes; and
forming a plurality of logical qubits having two possible logical states ($|0_L>$ and $|1_L>$), wherein each logical qubit is formed from any pair of physical qubits selected from either a first physical qubit decoherence-free set $\{|110>, |101>, |011>\}$ or a second physical qubit decoherence-free set $\{|001>, |010>, |100>\}$, so that collective dephasing of the physical qubits does not alter a relative phase of the logical qubits.

14. The apparatus of claim 13, wherein the optical coupling between the spatial light modulator and the microcavity is in the form of optical fiber sections optically coupled at respective first ends to the spatial light modulator output side and optically coupled at respective second ends to corresponding physical qubits supported by the microcavity.

15. The apparatus of claim 13, wherein the controller is adapted to perform operations on a single logical qubit by controlling the modulator to provide radiation to select physical qubits making up a logical qubit so as to tune the quantum states of the select physical qubits into the generalized anisotropic exchange interaction via microcavity quantum electromagnetic modes.

16. The apparatus of claim 13, wherein the controller is adapted to perform two-logical-qubit operations by controlling the modulator to provide radiation to select physical qubits making up two of the logical qubits so as to alter the quantum state of the one or more irradiated physical qubits.

17. The apparatus of claim 13, wherein the physical qubits are formed from nanoparticles selected from the group of nanoparticles consisting of: atoms, ions, molecules, and quantum dots.

18. The apparatus of claim 13, wherein the three physical qubits making up each logical qubit are arranged in a triangular architecture.

19. The apparatus of claim 13, wherein the physical qubits making up the logical qubits are arranged in an linear chain of alternating triangle architectures.

20. An apparatus for forming logical qubits that are insensitive to collective dephasing of physical qubits making up the logical qubits, comprising:
a laser source;
a spatial light modulator arranged to receive radiation from the laser at an input side and adapted to output modulated radiation at an output side in response to a control signal from a controller;
a microcavity optically arranged downstream of the spatial light modulator, the microcavity adapted to support the physical qubits so that each physical qubit can occupy one of two possible quantum states ($|0>$ and $|1>$) and so that the physical qubits can undergo a controlled exchange interaction; and
wherein the controller modulates the modulator so that each physical qubit is irradiated in manner that places the physical qubits in one of the two possible quantum states so as to form logical qubits having two possible logical states ($|0_L>$ and $|1_L>$) from any physical qubit pair selected from either a first physical qubit decoherence-free set $\{|110>, |101>, |011>\}$ or a second physical qubit decoherence-free set $\{|001>, |010>, |100>\}$, so that dephasing of the physical qubits does not alter a relative phase of the logical qubits.

21. The apparatus of claim 20, wherein the controller is adapted to modulate the modulator to alter the state of at least one of the physical qubits in one or more of the logical qubits in order to perform a quantum computing operation.

22. A method of forming logical qubits that are insensitive to collective dephasing of physical qubits making up the logical qubits, comprising:
supporting a collection of physical qubits in a microcavity adapted to allow for each physical qubit to occupy one of two possible quantum states ($|0>$ and $|1>$), and to allow for a controlled exchange interaction to occur between the physical qubits;
placing each physical qubit in one of the two possible quantum states by selectively addressing the physical qubits with an anisotropic exchange interaction;
forming from the physical qubits one or more logical qubits having two possible logical states ($|0_L>$ and $|1_L>$), including forming each logical qubit from a pair of physical qubits selected from either a first physical qubit decoherence-free set $\{|110>, |101>, |011>\}$ or a second physical qubit decoherence-free set $\{|001>, |010>, |100>\}$, so that collective dephasing of the physical qubits does not alter a relative phase of the one or more logical qubits.

23. The method of claim 22, including providing the generalized anisotropic exchange interaction via quantized cavity modes of an electromagnetic field induced by a laser.

24. The method of claim 22, further including performing single-qubit operations by selectively irradiating one or more of the physical qubits making up a logical qubit so as to alter the quantum state of the irradiated physical qubits.

25. The method of claim 22, further including performing two-qubit operations by selectively irradiation one or more of the physical qubits that make up two logical qubits so as to alter the quantum state of the irradiated physical qubits.

26. The method of claim 22, including reading out values of one or more of the one or more logical qubits by detecting a value of one of the physical qubits making up the one or more logical qubits.

27. The method of claim 22, including generating a controlled generalized anisotropic exchange interaction between physical qubits that make up one or more of the logical qubits by individually irradiating each physical qubit with radiation from a select quantum mode of a laser cavity that places the physical qubit in one of the two different possible qubit quantum states.

28. The method of claim 22, including arranging the three physical qubits making up each logical qubit in a triangular architecture.

29. The method of claim 22, including arranging the physical qubits making up the logical qubits into an linear chain of alternating triangle architectures.

* * * * *